May 22, 1934.　　　R. M. SMITH　　　1,959,771
INDICATING INSTRUMENT
Filed Feb. 6, 1932
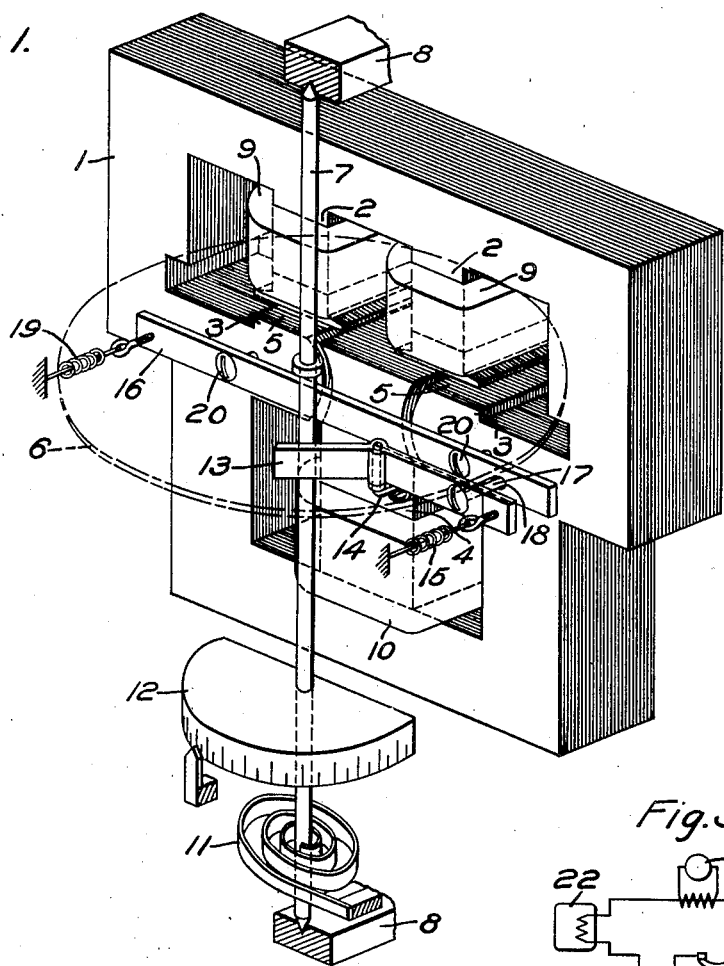
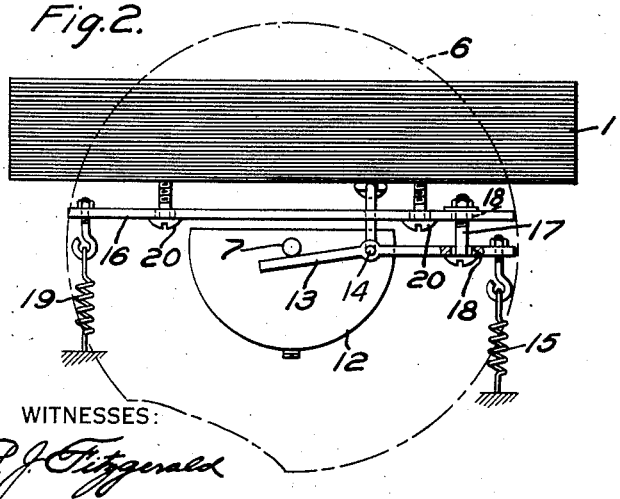
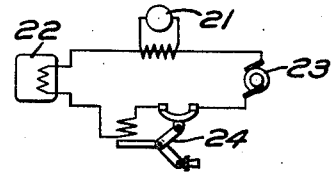
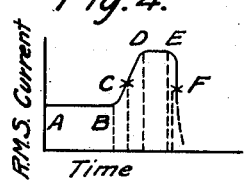
WITNESSES:
INVENTOR
Roy M. Smith.
BY
ATTORNEY Patented May 22, 1934

1,959,771

UNITED STATES PATENT OFFICE 1,959,771

INDICATING INSTRUMENT

Roy M. Smith, North Arlington, N. J., assignor to Westinghouse Electric & Manufacturing Company, a corporation of Pennsylvania Application February 6, 1932, Serial No. 591,282

2 Claims. (Cl. 171—95)

My invention relates to measuring instruments, and it has particular reference to devices for measuring transient electrical quantities.

According to my invention, I provide a measuring instrument, or an attachment therefor, for indicating the magnitude of a transient quantity, and a mechanism for locking the instrument in the position corresponding to the peak magnitude of the quantity.

Electrical apparatus is generally protected by devices which include relays. Such relays must be properly adjusted in order to suitably protect the apparatus under various abnormal conditions, such as those resulting from short circuits. The correct adjustments cannot be made unless the behavior of the apparatus under the abnormal conditions is known.

Heretofore, these conditions have been analyzed theoretically. The analyses have involved not only excessive labor, but have been inaccurate because of the various assumptions which must be made under the analytical methods.

A direct measurement of the effects of the abnormal conditions is desirable, therefore, in order to facilitate corrective steps.

It is, accordingly, an object of my invention to provide a device for recording the magnitude of a transient quantity.

Another object of my invention is to provide means for retaining a measuring instrument in the position to which it has been actuated by a transient quantity.

Another object of my invention is to provide a device for recording a transient quantity wherein the inertia of moving parts does not affect the accuracy thereof.

A further and more specific object of my invention is to provide a normally inactive device for measuring a transient quantity which is placed in operative position by the action of the transient.

Other objects of my invention will become evident from the following detailed description, taken in conjunction with the accompanying drawing, in which:

Figure 1 is a perspective view of a measuring instrument embodying my invention;

Fig. 2 is a plan view of the instrument illustrated in Fig. 1;

Fig. 3 is a diagram of an electrical system employing my invention; and

Fig. 4 is a graphical representation of a transient condition which may be measured by an instrument designed in accordance with my invention.

Referring to the drawing, the apparatus shown in Figs. 1 and 2 comprises a structure 1 of material permeable to magnetic flux. This structure is so shaped that depending portions 2 and projecting portions 3 and 4 define an air gap 5 within which a section of a metallic disk 6 is located. The disk 6 is mounted upon a shaft 7 which is rotatably positioned by suitable bearings 8.

A plurality of windings 9 and 10 surround the portions 2 and 4, and, when suitably energized from an alternating current source, not shown, are adapted to produce a shifting magnetic field within the air gap 5. Since a portion of the disk 6 is located within the air gap, the shifting field produced therein by the energized windings 9 and 10 tends to rotate the disk about its axis in a manner well known in the art.

The tendency of the disk 6 to rotate under the influence of the air gap flux is resisted by a spring 11 attached to the shaft 7 and to a stationary support. The resultant rotation of the shaft is indicated by a suitable scale 12 which is attached to the shaft 7.

The apparatus described above closely conforms to several well-known types of meters and relays, and, in fact, may be constructed from the standard parts of such instruments with slight modifications. My invention, however, is not to be restricted to the particular form of instrument described above.

In order to measure transient quantities, it is desirable to so construct the measuring device that an indication of a transient is recorded for a period longer than the duration of the transient.

My invention includes means, such as a brake, for holding the shaft assembly in the position to which it is rotated by the transient. The brake comprises a member 13 pivotally mounted on a shaft 14 which is attached to the structure 1. The member 13 is normally biased in frictional engagement with the shaft 7 by means of an adjustable spring 15 which is attached to the member 13 and to a stationary support.

In order to release the member 13 from engagement with the shaft 7, at a suitable time, an armature 16 of material permeable to magnetic flux is flexibly connected thereto by any suitable means, such as a rivet 17 which passes through relatively large diameter holes 18 in the member 13 and in the armature 16. An auxiliary spring 19 assists the spring 15 in biasing the armature away from the structure 1. The armature is slidably mounted on supports 20, and is adapted to be attracted to the structure 1 when the magnetic flux therein reaches a predetermined value.

The above apparatus may be associated with an electrical network in any suitable manner, such as that represented in Fig. 3 wherein an instrument 21 designed in accordance with my invention is associated with an electrical network 22 which is supplied with power from a source 23 through a protective circuit breaker 24.

In the operation of the above described apparatus, the windings 9 and 10 are connected to an electrical network, in a manner well known to the art, to produce a torque on the disk 6 which varies in accordance with a quantity to be measured, for example, current.

The windings 9 and 10, when energized, generate a magnetic flux which passes through the structure 1 and the armature 16, tending to attract the armature to the structure. However, the armature is so biased by the springs 15 and 19 that it is not affected by the flux produced by normal values of current, and consequently, the member 13 is normally biased against the shaft 7, preventing rotation thereof.

When the abnormal value of current flows in the network, such as the transient current resulting from a network short-circuit, the value of the flux produced by the windings 9 and 10 reaches an abnormal magnitude. At a predetermined value of flux, the armature 16 is attracted to the structure 1, thereby releasing the member 13 from engagement with the shaft 7. Since the shaft 7 is now free to rotate it, it assumes a position wherein the torques resulting from the spring 11 and the induction action of the disk are balanced. The resultant rotation of the shaft serves as a measure of the current flowing in the network, and the scale 12 may be calibrated to read the magnitude thereof directly.

A decrease in the magnitude of the abnormal current, such as that resulting from the opening of a protective network circuit breaker, is accompanied by a decrease of the flux in the structure 1, with the consequent return of the armature 16 to its normal position under the influence of the springs 15 and 19. This movement of the armature 16 permits the member 13 to return into frictional engagement with the shaft 7, thereby preventing further rotation of the shaft. The member 13, therefore, serves to hold the shaft in the position to which it has been rotated by the abnormal current, and the magnitude of the abnormal current may be readily ascertained by reference to the scale 12. The transient, therefore, serves to release a brake upon an indicating device, to move the device to the proper setting, and to re-apply the brake when the proper setting is attained. This series of operation may be more readily understood upon reference to Fig. 4 in which a curve of current (ordinates) plotted against time (abscissae) is sketched.

Referring to Fig. 4, the curve represents a current of normal magnitude flowing in a network during a time interval A—B. At the point B, a transient occurs, such as that resulting from a network short-circuit, and is represented by a steep wave front B—C—D rising well above normal current magnitudes. A measuring instrument designed in accordance with my invention is so adjusted that at a point C, which is above the normal current values, the brake mechanism is released from engagement with the meter shaft, and the instrument thenceforth indicates the magnitude of the transient.

Upon the expiration of the time interval required for the protective circuit breaker to open the network circuit, the current is interrupted, as at a point E, and the rapid decrease in magnitude of the transient results in a prompt resetting of the brake mechanism at a point F.

It should be noted that the shaft 7 is free to rotate during the time interval D—E. This permits the shaft assembly to return to the proper setting if the inertia of the assembly initially carries it past the correct position. Ordinarily, the duration of the transient condition D—E is ample for this adjustment. For extremely short transients, the disk 6 may be manually placed in the approximate setting, from which it will rapidly move to the correct setting upon the occurrence of the transient.

The time interval E—F required for the abnormal current to decrease to the value F, at which the brake is re-applied to the measuring instrument, is so small that the inertia of the shaft assembly prevents rotation thereof during the interval.

Although I have utilized an induction meter for purposes of illustration, my invention is also applicable to other types of instruments well-known to the prior art.

My invention, therefore, provides a device for measuring transients which is always available for operation, which is entirely automatic, and which always records the value of the last transient applied to the device. The application of my invention permits rapid, accurate determination of the peak values of transients, and greatly facilitates the protective and corrective solutions of problems introduced by transients.

I have also indicated a self-contained meter adapted to measure the magnitude of a transient; however, the braking device and indicating means may be utilized as an attachment to be added to standard relays of the induction type, if desired.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a device for measuring a quantity, a magnetic structure, means for generating a magnetic flux in the structure varying in accordance with the magnitude of the quantity, an element adapted to be rotated by the flux, a brake member normally biased against said element to prevent rotation thereof, and an armature movably mounted on and normally biased away from the structure and adapted to be attracted to the structure by the flux when the flux reaches a predetermined magnitude, said armature being so associated with the brake member that attraction of the armature to the structure serves to release the brake member from engagement with said element.

2. In a device for measuring a quantity, a magnetizable member, means for generating a magnetic flux in the magnetizable member in accordance with the magnitude of the quantity, an element disposed to be rotated by the flux, a brake normally biased against said element to prevent rotation thereof, a movable armature disposed to be attracted to said member by the magnetizable flux, biasing means for preventing movement of the armature toward the magnetizable member until the magnetic flux exceeds a predetermined amount, and means connecting the armature and the brake whereby movement of the armature to the magnetizable member releases the brake.

ROY M. SMITH.